(12) United States Patent
Choi et al.

(10) Patent No.: US 11,804,626 B2
(45) Date of Patent: Oct. 31, 2023

(54) BATTERY MODULES WITH IMPROVED HEAT DISSIPATION

(71) Applicant: SK Innovation Co., Ltd., Seoul (KR)

(72) Inventors: Ha Neul Choi, Daejeon (KR); Seok Hwan Lee, Daejeon (KR); Hae Ryong Jeon, Daejeon (KR); Seung Hoon Ju, Daejeon (KR)

(73) Assignee: SK ON CO., LTD., Seoul (KR)

( * ) Notice: Subject to any disclaimer, the term of this patent is extended or adjusted under 35 U.S.C. 154(b) by 221 days.

(21) Appl. No.: 16/892,600

(22) Filed: Jun. 4, 2020

(65) Prior Publication Data
US 2020/0388891 A1    Dec. 10, 2020

(30) Foreign Application Priority Data

Jun. 7, 2019 (KR) .................. 10-2019-0067088

(51) Int. Cl.
*H01M 10/6554* (2014.01)
*H01M 10/613* (2014.01)
(Continued)

(52) U.S. Cl.
CPC ... *H01M 10/6554* (2015.04); *H01M 10/0413* (2013.01); *H01M 10/425* (2013.01); *H01M 10/613* (2015.04); *H01M 10/647* (2015.04); *H01M 50/211* (2021.01); *H01M 50/224* (2021.01); *H01M 50/233* (2021.01); *H01M 50/581* (2021.01)

(58) Field of Classification Search
CPC .......... H01M 10/6554; H01M 10/613; H01M 10/647; H01M 10/0413; H01M 10/425; H01M 10/482; H01M 50/581; H01M 50/20

USPC ..................... 429/120, 156, 159
See application file for complete search history.

(56) References Cited

U.S. PATENT DOCUMENTS

2003/0118900 A1    6/2003  Otohata
2017/0373289 A1*  12/2017  Lee .................. H01M 10/653
(Continued)

FOREIGN PATENT DOCUMENTS

DE    102015110667 A1 *  1/2017
DE    102018213290 A1 *  2/2020
(Continued)

OTHER PUBLICATIONS

Extended European Search Report issued by the European Patent Office dated Nov. 6, 2020.

*Primary Examiner* — Sean P Cullen
(74) *Attorney, Agent, or Firm* — IP & T GROUP LLP (57) ABSTRACT

A battery module includes a battery cell stack in which a plurality of battery cells are stacked; and a first plate and a second plate disposed on one side and the other side of the battery cell stack, respectively, to discharge heat generated by the plurality of battery cells externally. The plurality of battery cells include a receiving portion having a quadrangular shape, and a sealing portion, partially disposed on an outer periphery of the receiving portion. The battery cell stack is provided, by alternately stacking, at least one first battery cell of which a surface on which the sealing portion is not disposed faces the first plate, and at least one second battery cell of which a surface on which the sealing portion is not disposed faces the second plate.

12 Claims, 6 Drawing Sheets

(51) Int. Cl.
*H01M 10/647* (2014.01)
*H01M 10/04* (2006.01)
*H01M 10/42* (2006.01)
*H01M 50/581* (2021.01)
*H01M 50/233* (2021.01)
*H01M 50/224* (2021.01)
*H01M 50/211* (2021.01)

(56) References Cited

U.S. PATENT DOCUMENTS

2018/0337376 A1\* 11/2018 Jin ..................... H01M 10/613
2019/0027714 A1\* 1/2019 Jung .................. H01M 50/124

FOREIGN PATENT DOCUMENTS

| | | | |
|---|---|---|---|
| DE | 102020213244 A1 \* | 4/2022 | |
| EP | 2833434 A1 | 2/2015 | |
| EP | 3331060 A1 | 6/2018 | |
| EP | 3373384 A1 | 9/2018 | |
| JP | 2001250515 A \* | 9/2001 | |
| KR | 10-2016-0133776 A | 11/2016 | |
| KR | 2018029856 A \* | 3/2018 | ............ H01M 10/04 |
| KR | 10-2018-0125795 A | 11/2018 | |

\* cited by examiner

BATTERY MODULES WITH IMPROVED HEAT DISSIPATION

CROSS-REFERENCE TO RELATED APPLICATION(S)

This application claims the benefit under 35 USC 119(a) of Korean Patent Application No. 10-2019-0067088 filed on Jun. 7, 2019 in the Korean Intellectual Property Office, the entire disclosure of which is incorporated herein by reference for all purposes.

BACKGROUND

The present disclosure relates to a battery module.

Secondary batteries, unlike primary batteries, may be charged and discharged, and thus, may be applied to devices within various fields, such as digital cameras, cellphones, laptops, and hybrid vehicles. Examples of the secondary battery include a nickel-cadmium battery, a nickel-metal hydride battery, a nickel-hydrogen battery, a lithium secondary battery and the like.

Among such secondary batteries, many studies have been conducted into lithium secondary batteries having high energy density and discharge voltages. Recently, lithium secondary batteries have been manufactured as pouch-type battery cells with flexibility to be configured and used in the form of a module through the connection of a plurality of pieces.

On the other hand, when the battery module is used for an extended period of time, heat may be generated by the battery, and especially when charged, the internal temperature may rise rapidly, and the temperature rise of the battery may shorten the life of the battery and deteriorate the efficiency of the battery. In addition, fire or explosion may occur in the worst case.

Therefore, a cooling system for cooling a battery cell accommodated therein is required in the battery module. However, in the related art case, there is a problem in that cooling efficiency is very low because heat generated by the battery cells may not be effectively discharged.

SUMMARY

An aspect of the present disclosure is to provide a battery module capable of effectively dissipating heat generated in a battery cell.

According to an aspect of the present disclosure, a battery module includes a battery cell stack in which a plurality of battery cells are stacked, and a first plate and a second plate disposed on one side and the other side of the battery cell stack, respectively, to discharge heat generated by the plurality of battery cells externally. The plurality of battery cells include a receiving portion, and a sealing portion, partially disposed on an outer periphery of the receiving portion. The battery cell stack is provided, by alternately stacking, at least one first battery cell of which a surface on which the sealing portion is not disposed faces the first plate, and at least one second battery cell of which a surface on which the sealing portion is not disposed faces the second plate.

The plurality of battery cells may be stacked in a left-right direction and may be disposed to be orthogonal to the first plate and the second plate.

At least one of the first plate and the second plate may include a plurality of protrusions protruding from one surface facing the battery cell stack. The plurality of protrusions may have one ends contacting any one surfaces of the plurality of battery cells on which the sealing portion is not disposed.

The sealing portion of the plurality of battery cells may be inserted into a receiving groove disposed between the plurality of protrusions.

The sealing portion may be fixed by an adhesive member after a portion of the sealing portion is folded at least once.

The first plate and the second plate may be formed of an aluminum (Al) material.

The battery module may further include a heat transfer member filling at least one of a space between the battery cell stack and the first plate and a space between the battery cell stack and the second plate.

The heat transfer member may be formed of any one of thermal grease, a thermally conductive adhesive, an epoxy resin, and a thermal pad.

At least a portion of the sealing portion may be embedded in the heat transfer member.

The battery module may further include a cooling device coupled to at least one of external surfaces of the first plate and the second plate.

A receiving portion of the at least one first battery cell may be stacked to face an entirety of a receiving portion of the at least one second battery cell.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible, as will be apparent after an understanding of the disclosure of this application.

The drawings may not be to scale, and the relative size, proportions, and depiction of elements in the drawings may be exaggerated for clarity, illustration, and convenience.

Figure 1:
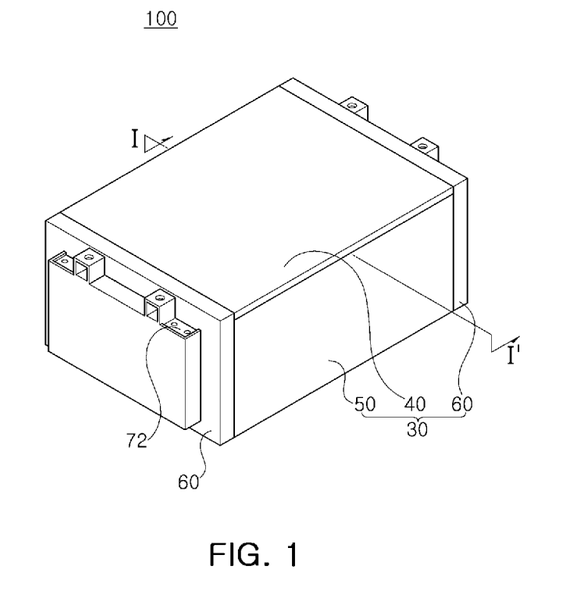
FIG. 1 is a perspective view schematically illustrating a battery module according to an exemplary embodiment.
Figure 2:
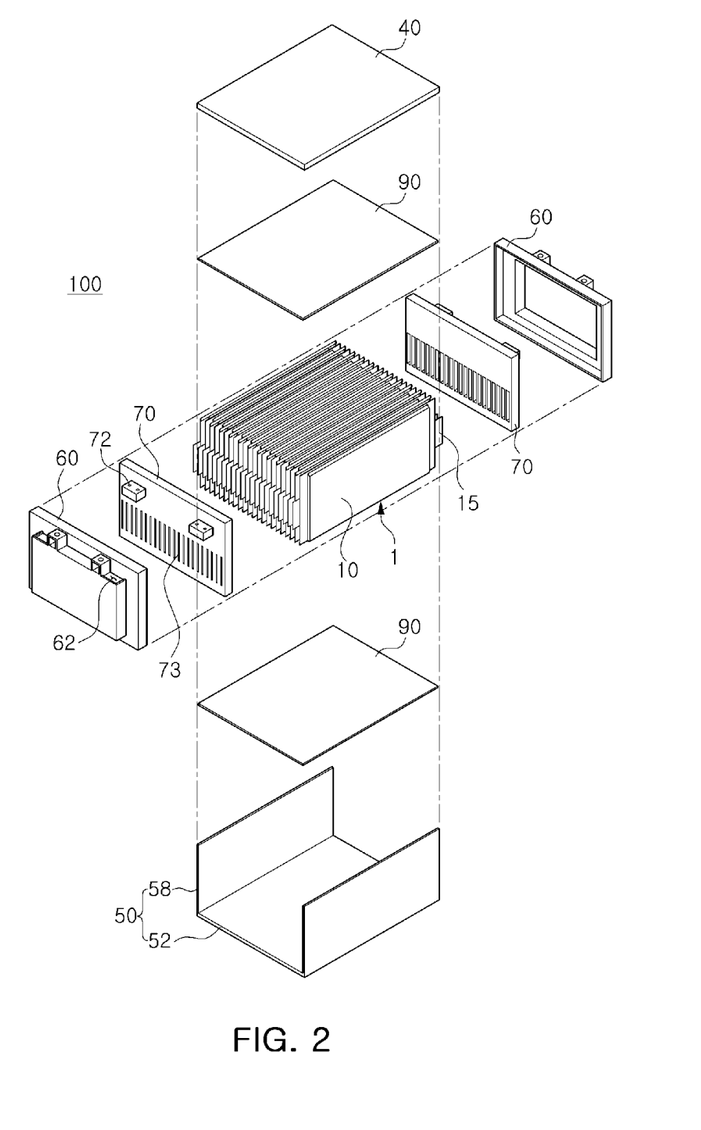
FIG. 2 is an exploded perspective view of the battery module illustrated in FIG. 1.

FIG. 1 is a perspective view schematically illustrating a battery module according to an exemplary embodiment, and FIG. 2 is an exploded perspective view of the battery module illustrated in FIG. 1.

Figure 3:
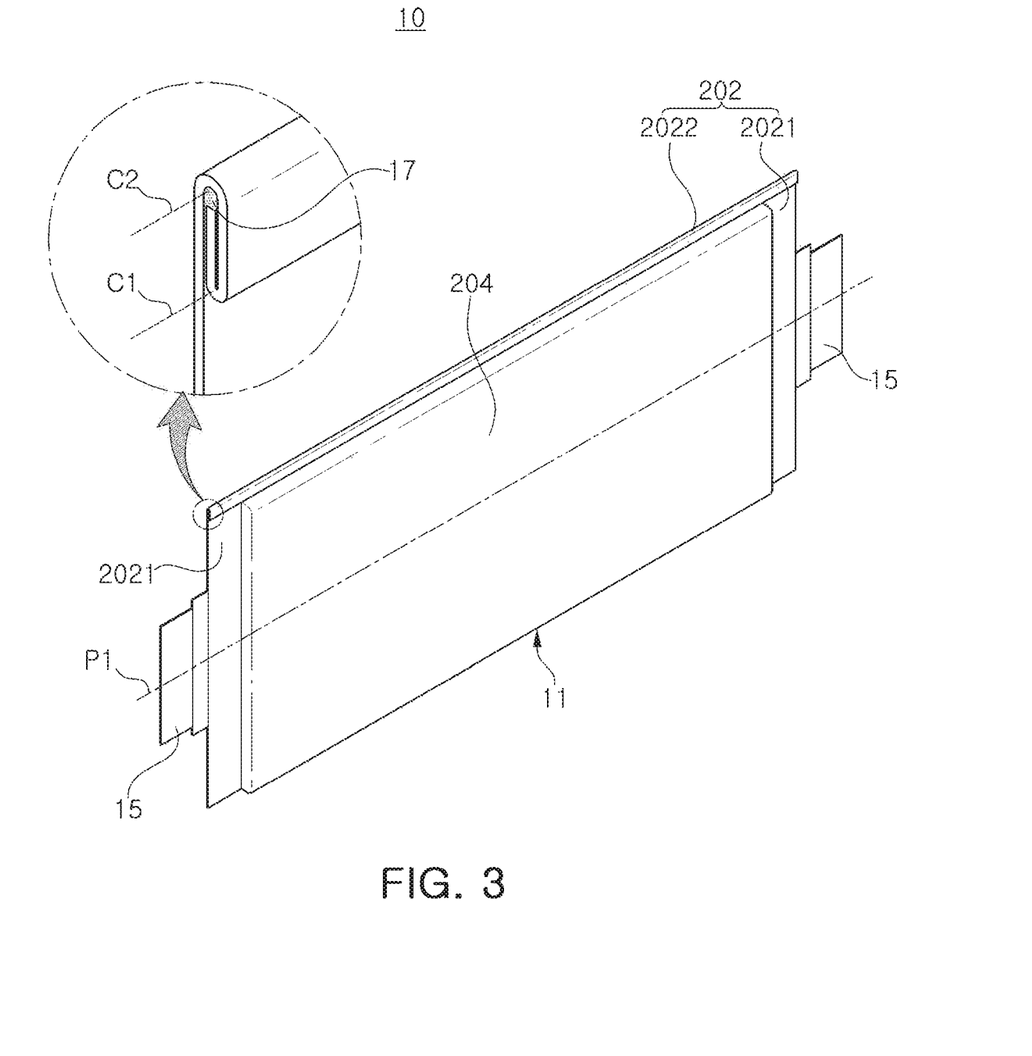
FIG. 3 is an enlarged perspective view of a battery cell of FIG. 2.
Figure 4:
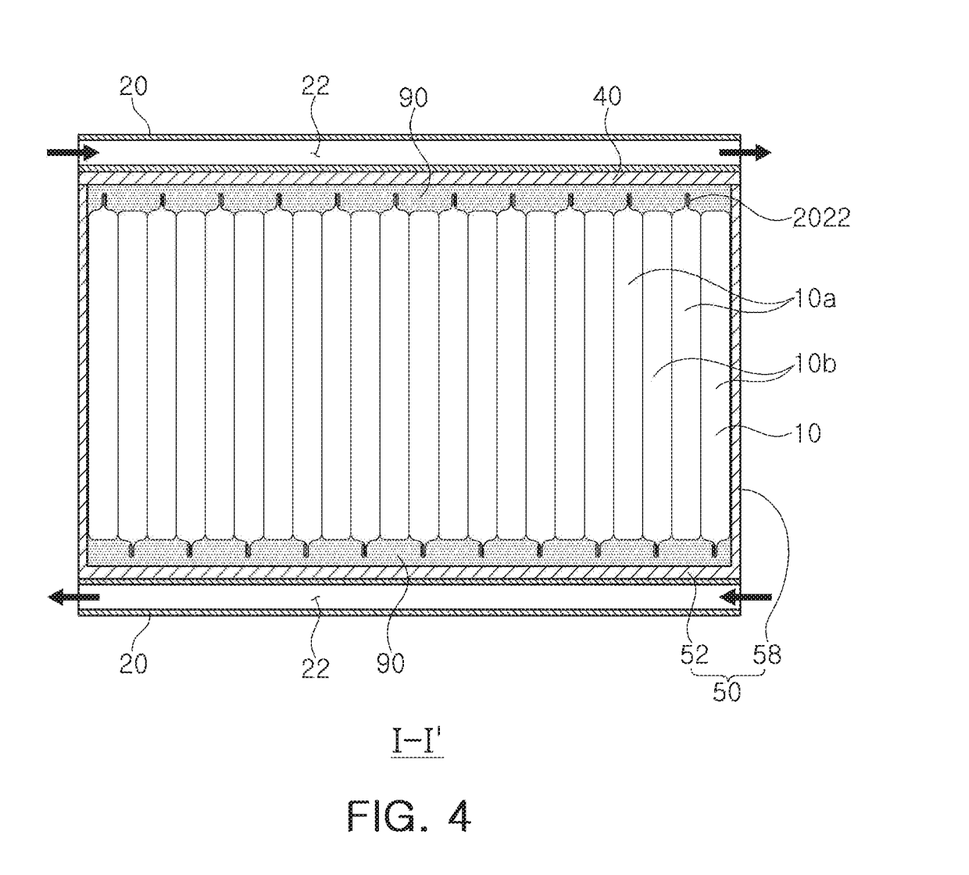
FIG. 4 is a cross-sectional view taken along line I-I' of FIG. 1.

FIG. 3 is an enlarged perspective view of a battery cell of FIG. 2, and FIG. 4 is a cross-sectional view taken along line I-I' of FIG. 1. In this case, for convenience of description, a cooling device 20 is only illustrated in FIG. 4 and is omitted in FIGS. 1 and 2.

Referring to FIGS. 1 to 4, a battery module 100 according to an exemplary embodiment may include a battery cell stack 1, an insulating cover 70, a heat transfer member 90, and a case 30.

The battery cell stack 1 is formed by stacking a plurality of battery cells 10 illustrated in FIG. 4. In this embodiment, although the battery cells 10 are stacked in the left-right direction (or the horizontal direction), the battery cells may also be configured to be stacked in the vertical direction as required.

Each of the battery cells 10 may be a pouch-type secondary battery, and may have a structure in which an electrode lead 15 protrudes externally.

The battery cell 10 may be configured in a form in which an electrode assembly (not illustrated) is accommodated in a pouch 11.

The electrode assembly includes a plurality of electrode plates and electrode tabs and is accommodated in the pouch 11. In this case, the electrode plate is comprised of a positive electrode plate and a negative electrode plate, and the electrode assembly may be configured in such a manner that the positive electrode plate and the negative electrode plate are stacked with a separator interposed therebetween so that wide surfaces face each other.

The positive electrode plate and the negative electrode plate are formed as a structure in which an active material slurry is applied to a current collector, and the slurry may be generally formed by stirring a granular active material, an auxiliary conductor, a binder, and a plasticizer in a state in which a solvent is added.

In addition, in the electrode assembly, a plurality of positive electrode plates and a plurality of negative electrode plates are stacked in the vertical direction. In this case, the electrode tab is respectively provided on the plurality of positive electrode plates and the plurality of negative electrode plates, and the electrode plates having the same polarity may contact each other and may be connected to the same electrode lead 15.

In this embodiment, two electrode leads 15 may be disposed to face each other in opposite directions.

The pouch 11 is formed to have a container shape to provide an internal space in which the electrode assembly and the electrolyte (not illustrated) are accommodated. In this case, a portion of the electrode lead 15 of the electrode assembly is exposed to the outside of the pouch 11.

The pouch 11 may be divided into a sealing portion 202 and a receiving portion 204.

The receiving portion 204 is formed to have a container shape to provide a quadrangular-shaped interior space. The electrode assembly and the electrolyte are accommodated in the internal space of the receiving portion 204.

The sealing portion 202 is formed to have the form of a flange extending outwardly from the receiving portion 204 formed to have the form of a container. Therefore, the sealing portion 202 is disposed in the form of an edge portion along the outer periphery of the receiving portion 204.

The bonding between the sealing portions 202 may be performed by a thermal welding method, but the method is not limited thereto.

Also, in this embodiment, the sealing portion 202 may be divided into a first sealing portion 2021 in which the electrode lead 15 is disposed and a second sealing portion 2022 in which the electrode lead 15 is not disposed.

In this embodiment, the pouch 11 is formed by forming a sheet of exterior material. In more detail, after forming one or two receiving portions on one exterior material, the exterior material is folded so that the receiving portions form one space (e.g., a receiving portion), thereby completing the pouch 11.

In this embodiment, the receiving portion 204 is formed to have a quadrangular shape. In addition, the sealing portion 202 formed by bonding an exterior material is provided on an outer periphery of the receiving portion 204. However, as described above, it is not necessary to form the sealing portion 202 on the surface on which the exterior material is folded. Therefore, in this embodiment, the sealing portion 202 is formed on the outer periphery of the receiving portion 204, and is provided on only three surfaces of the receiving portion 204, and the sealing portion is not formed on any one surface (a lower surface in FIG. 3) of outer peripheries of the receiving portion.

In this embodiment, since the electrode leads 15 are disposed to face each other in opposite directions, the two electrode leads 15 are disposed on the sealing portions 202 formed on different sides. Accordingly, the two sealing portions provided on three sides of the receiving portion 204 are comprised of two first sealing portions 2021 on which the electrode leads 15 are disposed, and one second sealing portion on which the electrode lead 15 is not disposed.

In addition, the battery cell 10 of this embodiment configures the sealing portion 202 in a form in which it is folded at least once to increase the bonding reliability of the sealing portion 202 and significantly reduce the area of the sealing portion 202.

In more detail, the second sealing portion 2022 in which the electrode lead 15 is not disposed, from among the sealing portions 202 according to this embodiment, is folded twice and is then fixed by an adhesive member 17.

For example, the second sealing portion 2022 may be folded 180° along a first bending line C1 illustrated in FIG. 3, and then folded again along a second bending line C2 illustrated in FIG. 3.

In this case, the inside of the second sealing portion 2022 may be filled with the adhesive member 17, whereby the second sealing portion 2022 may be maintained in the shape folded twice by the adhesive member 17. The adhesive member 17 may be formed of an adhesive having relatively high thermal conductivity. For example, the adhesive member 17 may be formed of epoxy or silicone, but is not limited thereto.

In this embodiment, the adhesive member 17 is formed of a different material from the heat transfer member 90, but may also be formed of the same material as necessary.

When the adhesive member 17 having high thermal conductivity is filled inside of the second sealing portion 2022 as described above, the second sealing portion 2022 may quickly transfer heat from the battery cell to the heat transfer member 90.

The battery cell 10 configured as described above generates current as a nickel metal hydride (Ni-MH) battery or a lithium ion (Li-ion) battery capable of charging and discharging.

The battery cells 10 are vertically erected in a case 30 to be described later and are stacked in the left and right directions. Therefore, the battery cells 10 are disposed to be orthogonal to a first plate 50 and a second plate 40 which are respectively disposed on the upper and lower sides of the battery cell stack 1.

Also, as illustrated in FIG. 4, at least one of the battery cells 10 stacked in the left and right directions is stacked in a different direction.

In more detail, in this embodiment, the battery cell 10 may be divided into a first battery cell 10a and a second battery cell 10b depending on the direction in which the second sealing portion 2022 is disposed. The first battery cell 10a is defined as the battery cell 10 on which the second sealing portion 2022 is disposed to face upward or the battery cell 10 of which a surface on which the sealing portion 202 is not disposed faces downward. The second battery cell 10b is defined as the battery cell 10 on which the second sealing portion 2022 is disposed to face downward or the battery cell 10 of which a surface on which the sealing portion 202 is not disposed faces upward.

In this embodiment, the first battery cell 10a and the second battery cell 10b are the battery cells 10 having the same configuration, and are only distinguished by the arrangement direction of the second sealing portion 2022.

Referring to FIG. 4, in this embodiment, the first battery cell 10a and the second battery cell 10b are alternately disposed in the left and right directions. Therefore, when the battery cells 10 are stacked in the left-right directions, the second battery cells 10b are disposed on both sides of the first battery cell 10a except for both ends, and the first battery cells 10a are also disposed on both sides of the second battery cell 10b.

As illustrated in FIG. 3, in the battery cell 10 of this embodiment, the electrode lead 15 is disposed along a cell center line P1 passing through the center of the receiving portion 204. Even when the battery cells 10 are disposed as illustrated in FIG. 4, the electrode leads 15 of the first battery cell 10a and the second battery cell 10b are disposed in the same position.

In addition, as illustrated in FIG. 4, the battery cells 10 are stacked in such a manner that the receiving portion 204 of each battery cell 10 faces the receiving portion 204 of another battery cell 10 disposed to be adjacent thereto and does not face the sealing portion 202. For example, the entire receiving portion 204 of the first battery cell 10a is stacked to face the entire receiving portion 204 of the second battery cell 10b.

Through such a configuration, the battery module 100 according to this embodiment may increase the heat dissipation effect of the battery cells 10.

Since the battery cell 10 of this embodiment has the sealing portion 202 disposed on only three surfaces of outer peripheries of the receiving portion 204, one surface of the receiving portion 204 without the sealing portion 202 may have a reduced length of a heat radiation, compared to the other surfaces. In this case, since the heat transfer may be performed more smoothly through the above-described one surface, the above-described one surface has a greater heat dissipation effect than the other three surfaces.

Accordingly, if the entire battery cell stack 1 is comprised of only the first battery cells 10a or only the second battery cells 10b, the portions on which the second sealing portion 2022 is disposed, and the one surface portion without the sealing portion 202, have different heat transfer amounts. In this case, temperature variations occur in the upper and lower portions of the battery cell stack 1, and thus, it is difficult to uniformly cool the inside of the battery cell 10.

Therefore, in this embodiment, as described above, at least one first battery cell 10a and at least one second battery cell 10b are alternately stacked to form the battery cell stack 1. In this case, since heat may be uniformly discharged through the upper and lower portions of the battery cell stack 1, the entire interior of the battery cell 10 may be uniformly cooled. In addition, since the distance between the sealing portions 202 is extended, breakage of the insulation between the battery cells 10 due to contact between the sealing portions 202 may be prevented.

On the other hand, although not illustrated, at least one buffer pad or a cooling plate may be disposed between the stacked battery cells 10.

The buffer pad may be provided to prevent the volume of the entire battery cells from expanding in the case in which a specific battery cell expands. The buffer pad may be formed of a polyurethane foam, but the material is not limited thereto.

When the buffer pad is formed of an adhesive material, the battery cells 10 may be bonded to each other by the buffer pad to form the battery cell stack 1. However, the configuration is not limited thereto, and a separate fixing member may also be added to fix the stacked battery cells 10.

The cooling plate may be provided to quickly transfer heat generated by the battery cells 10 to the cooling device 20 side. Therefore, the cooling plate may be disposed to contact the heat transfer member 90 or the case 30.

The cooling plate may be formed of a metal material having high thermal conductivity, but the material is not limited thereto.

The case 30 defines the exterior of the battery module 100 and is disposed outside of the plurality of battery cells 10 to protect the battery cells 10 from the external environment. At the same time, the case 30 of this embodiment also functions as a cooling member of the battery module.

The case 30 of this embodiment may include the first plate 50 disposed on one side of the battery cell stack 1, the second plate 40 disposed on the other side of the battery cells 10, and a side cover 60 disposed on a side of the battery cells 10 on which the electrode leads 15 are disposed.

The first plate 50 may include a lower plate 52 disposed below the battery cell 10 to support the lower surface of the battery cells 10, and side plates 58 supporting the sides of the battery cells 10 on which the receiving portions 204 are disposed. However, as required, the side plates 58 and the lower plate 52 may also be configured as independent components.

The side plates 58 are formed to extend from both sides of the lower plate 52, and are disposed on the sides of the horizontally-stacked battery cell stack 1 to support the receiving portions 204 of the battery cells 10.

To firmly support the battery cells 10, the side plates 58 may be configured to contact the receiving portions 204 of the battery cells 10, but the configuration is not limited thereto. For example, various modifications may be made as required, such as interposing a thermal pad or a buffer member between the side plate 58 and the receiving portion 204.

The first plate 50 configured as described above is formed of a material having high thermal conductivity such as a metal. For example, the first plate 50 may be formed of aluminum. However, the material is not limited thereto, and various materials may be used as long as the material has similar strength and thermal conductivity, even in the case in which the material is not a metal.

The second plate 40 is disposed on the battery cell 10 and is coupled to the upper surface of the battery cells 10. In addition, the second plate 40 is coupled to upper ends of the side plates 58 of the first plate 50. Therefore, when the second plate 40 is coupled to the first plate 50, the second plate 40 and the first plate 50 have a shape of a tubular member of which the inside is empty.

The second plate 40 is formed of a material having relatively high thermal conductivity such as a metal, similarly to the first plate 50. The second plate 40 may be formed of aluminum, but the material is not limited thereto, and various materials may be used as long as the material has similar strength and thermal conductivity even in the case in which the material is not a metal.

The first plate 50 and the second plate 40 may be combined by welding or the like, the method is not limited thereto, and various modifications may be performed, such as coupling the plates by a sliding method or by using a fixing member such as a bolt or a screw.

The heat transfer member 90 may be filled between the battery cells 10 and the first plate 50 and between the battery cells 10 and the second plate 40.

The heat transfer member 90 transfers heat generated by the battery cell 10 to the case 30. To this end, the heat transfer member 90 is formed of a material having a relatively high thermal conductivity. For example, the heat transfer member 90 may be formed of any one of thermal grease, a thermal adhesive, an epoxy resin, and a thermal pad, but the embodiment is not limited thereto.

The heat transfer member 90 may be disposed on the inner surface of the case 30 in the form of a pad, or may be formed by being applied to the inner surface of the case 30 in a liquid or gel state.

The second sealing portion 2022 may be disposed in a form that is embedded in the heat transfer member 90, whereby heat released through the second sealing portion 2022 may be quickly transferred to the first and second plates 50 and 40 through the heat transfer member 90.

The heat transfer member 90 of this embodiment has high insulation, and for example, a material having a dielectric strength in the range of 10 to 30 KV/mm may be used.

Accordingly, in the case of the battery module 100 according to this embodiment, even in a case in which the insulation is partially destroyed in the battery cell 10, the insulation between the battery cell 10 and the case 30 may be maintained by the heat transfer member 90 disposed in the vicinity of the battery cell 10.

In addition, since the heat transfer member 90 is disposed in a form of filling a space between the battery cells 10 and the case 30, the overall rigidity of the battery module 100 is also reinforced.

In this embodiment, the case in which the heat transfer member 90 is disposed on both the upper and lower portions of the battery cell 10 is provided as an example, but the configuration is not limited thereto. For example, the heat transfer member 90 may also be disposed only on one of the upper and lower portions of the battery cell 10. In addition, the heat transfer member 90 may be disposed between the side surface of the battery cell 10 and the side plate as required.

The side covers 60 are coupled to both sides on which the electrode leads 15 of the battery cells 10 are disposed, respectively.

The side covers 60 are coupled to the first plate 50 and the second plate 40 to complete the appearance of the battery module 100 together with the first plate 50 and the second plate 40.

The side covers 60 may be formed of an insulating material such as a resin, and may have a through-hole 62 to expose a connection terminal 72 of the insulating cover 70 to be described later.

The side cover 60 may be coupled to the first plate 50 and the second plate 40 through a fixing member such as a screw or bolt, but the embodiment is not limited thereto.

The insulating cover 70 may be interposed between the side cover 60 and the battery cell stack 1.

The insulating cover 70 is coupled to one surface of the battery cells 10 on which the electrode leads 15 are disposed.

The electrode leads 15 penetrate through the insulating cover 70 and are interconnected on the outside of the insulating cover 70. To this end, the insulating cover 70 may be provided with a plurality of through-holes 73 in which the electrode leads 15 are inserted.

In addition, the insulating cover 70 may be provided with a connection terminal 72 for external connection.

Therefore, the battery cells 10 are electrically connected to an external configuration through the connection terminal 72, and to this end, the electrode lead 15 may be electrically connected to the connection terminal 72 through circuit wiring (not illustrated) provided in the insulating cover 70.

The connection terminal 72 is exposed externally through the through-hole 62 formed in the side cover 60. Therefore, the through-hole 62 of the side cover 60 is formed to have a size corresponding to the size and shape of the connection terminal 72.

In addition, the insulating cover 70 may include a circuit board (for example, a PCB) and a plurality of electronic devices mounted on the circuit board, thereby performing a function of sensing the voltage of the battery cell 10.

On the other hand, as illustrated in FIG. 4, a cooling device 20 may be coupled to a lower surface of the first plate 50 and an upper surface of the second plate 40. For convenience of description, the cooling device 20 is only illustrated in FIG. 4.

The cooling device 20 of this embodiment is a water-cooled cooling device having a cooling passage 22 therein. However, the configuration is not limited thereto, and an air-cooled cooling device may also be used.

The cooling device 20 may be integrally coupled to the case 30 and included in the battery module 100, but the configuration is not limited thereto, and for example, may also be provided in a device in which the battery module is mounted, separately from the battery module.

Although not illustrated, a thermal pad may be disposed between the first plate 50 or the second plate 40 and the cooling device 20 for effective heat transfer.

Since in the battery module 100 according to the this embodiment configured as described above, the first battery cell 10a and the second battery cell 10b are alternately stacked to constitute the battery cell stack 1, heat may be uniformly released to the upper and lower portions of the battery cell stack 1. Therefore, since the inside of the battery cell 10 may be uniformly cooled as a whole, the heat dissipation effect may be enhanced. In addition, since the separation distance between the sealing portions 202 is extended, an insulating distance between the sealing portions 202 may be secured.

An exemplary embodiment of the present disclosure is not limited to the above-described embodiment, and various modifications may be used.

Figure 5:
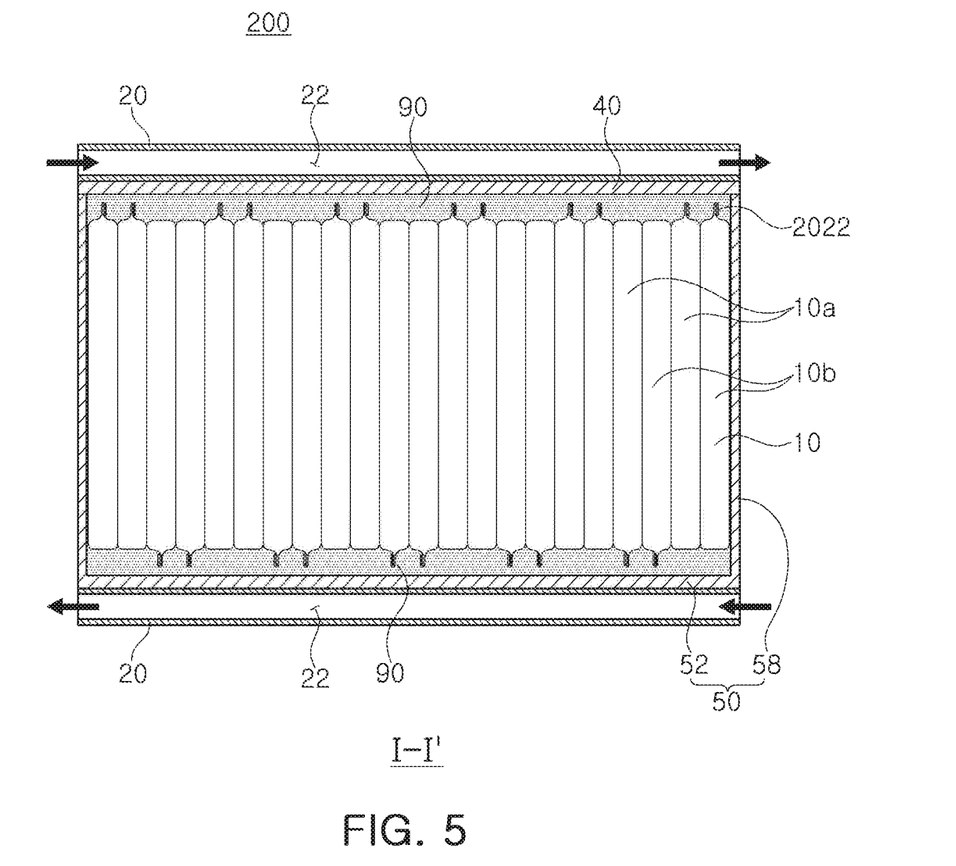
FIG. 5 is a cross-sectional view of a battery module according to another exemplary embodiment.

FIG. 5 is a cross-sectional view of a battery module according to another exemplary embodiment, illustrating a cross-section taken along line I-I' of FIG. 1.

Referring to FIG. 5, in a battery module 200 according to an exemplary embodiment, a plurality of first battery cells 10a and a plurality of second battery cells 10b are alternately stacked.

In this embodiment, the case in which as the first battery cells 10a and the second battery cells 10b, respectively two battery cells are alternately disposed is provided as an example. However, the configuration is not limited thereto, and for example, respectively three or more battery cells may also be alternately disposed as required.

In addition, in this embodiment, the case in which the first battery cell 10a and the second battery cell 10b are alternately disposed in the same number is exemplified, but is not limited thereto. For example, two first-battery cells 10a and one first-battery cell 10b may also be alternately disposed. In detail, the number of the first battery cells 10a and the number of the second battery cells 10b may be different from each other, as required.

Figure 6:
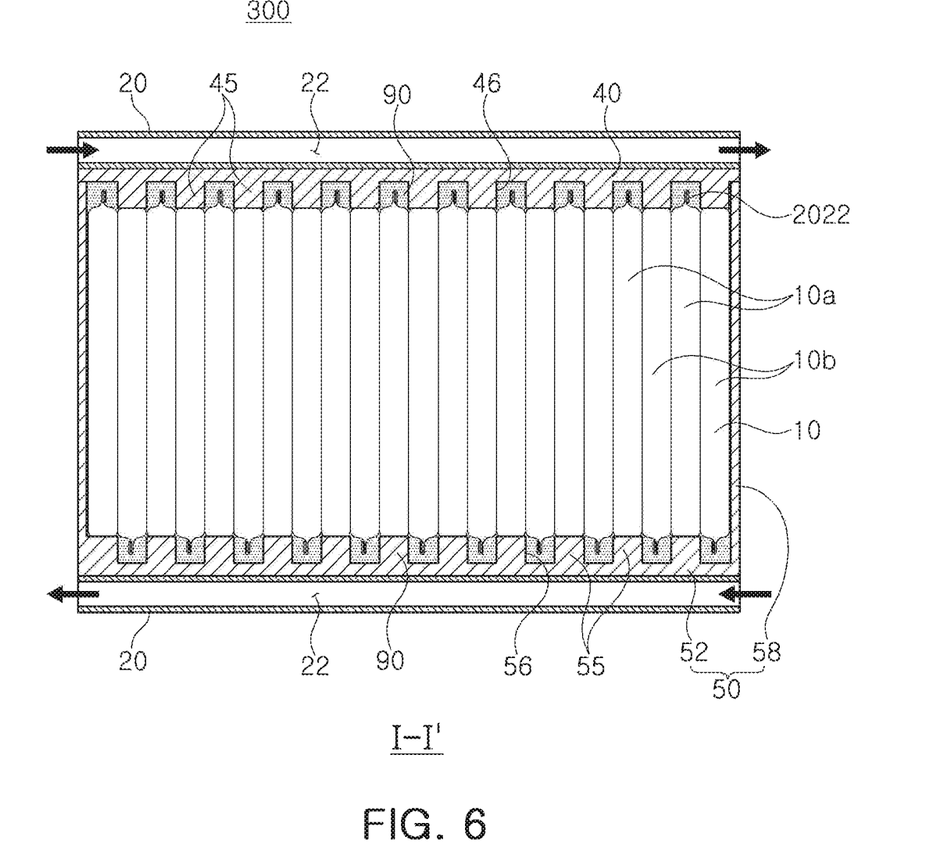
FIG. 6 is a cross-sectional view of a battery module according to another exemplary embodiment.

FIG. 6 is a cross-sectional view of a battery module according to another exemplary embodiment, illustrating a cross-section taken along line I-I' of FIG. 1.

Referring to FIG. 6, a battery module 300 according to the embodiment is configured in such a manner that a plurality of protrusions 45 and 55 are provided on the case 30.

A plurality of protrusions 45 and 55 are formed protruding toward the battery cells 10 from the inner surfaces of the second plate 40 and the lower plate 52, and the ends of the protrusions 45 and 55 are disposed to contact the receiving portions 204 of the battery cells 10.

Receiving grooves 46 and 56 are formed between the protrusions 45 and 55, and the second sealing portion 2022 of the battery cell 10 is disposed in the receiving grooves 46 and 56.

In this case, since the heat of the battery cell 10 may be released more effectively, the heat dissipation performance of the battery module may be improved.

For example, in the above-described embodiment, the case in which the cooling device is disposed outside of the first plate and the second plate is exemplified, but various modifications may be performed. For example, the cooling device may be disposed inside the first plate and the second plate; or the first plate and the second plate may be configured to include a cooling passage. Also, the respective embodiments may be implemented in combination with each other.

As set forth above, a battery module according to an exemplary embodiment may uniformly cool the entire interior of battery cells, thereby increasing a heat dissipation effect. In addition, since the distance between sealing portions is extended, the insulating distance between the sealing portions may be secured.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery module comprising:
a battery cell stack having a plurality of battery cells stacked in a first direction, wherein the plurality of battery cells include at least one first battery cell and at least one second battery cell; and
a first plate disposed on a lower side of the battery cell stack and a second plate disposed on an upper side of the battery cell stack to discharge heat from the plurality of battery cells to an outside of the first plate and the second plate,
wherein the first battery cell and the second battery cell each include a receiving portion, and a sealing portion, the sealing portion being partially disposed on an outer periphery of the receiving portion,
wherein the sealing portion of the first battery cell is disposed to face the second plate and the sealing portion of the second battery cell is disposed to face the first plate,
wherein the first plate includes a plurality of first protrusions protruding toward the battery cell stack and contacting the receiving portion of the first battery cell and includes a plurality of first receiving grooves disposed between the plurality of first protrusions and receiving the sealing portion of the second battery cell,
wherein the second plate includes a plurality of second protrusions protruding toward the battery cell stack and contacting the receiving portion of the second battery cell and includes a plurality of second receiving grooves disposed between the plurality of second protrusions and receiving the sealing portion of the first battery cell, and
wherein each of the second receiving grooves is disposed to oppose a corresponding one of the first protrusions in a second direction perpendicular to the first direction.

2. The battery module of claim 1, wherein the at least one first battery cell and the at least one second battery cell are alternately disposed along the first direction.

3. The battery module of claim 1,
wherein each of the plurality of battery cells includes a first surface on which the sealing portion is not disposed and a second surface opposing the first surface on which the sealing portion is disposed,
wherein the battery cell stack is provided, by alternately stacking, the at least one first battery cell of which the first surface faces the first plate, and the at least one second battery cell of which the first surface faces the second plate.

4. The battery module of claim 1, wherein the receiving portion of the at least one first battery cell is stacked to face an entirety of the receiving portion of the at least one second battery cell.

5. The battery module of claim 1,
wherein each of the plurality of the first protrusions and the plurality the second protrusions have one end contacting the receiving portion of the plurality of battery cells.

6. The battery module of claim 1, wherein each protrusion of the plurality of first protrusions has a flat top surface in contact with a same size flat, non-sealing surface of the first battery cell.

7. The battery module of claim 1, wherein each protrusion of the plurality of second protrusions has a flat top surface in contact with a same size flat, non-sealing surface of the second battery cell.

8. The battery module of claim 1, wherein the first plate and the second plate are formed of an aluminum (Al) material.

9. The battery module of claim 1, further comprising a cooling device coupled to at least one of external surfaces of the first plate and the second plate.

10. The battery module of claim 1, further comprising a heat transfer member filling at least one of a space between the battery cell stack and the first plate and a space between the battery cell stack and the second plate.

11. The battery module of claim 10, wherein the heat transfer member is formed of any one of thermal grease, a thermally conductive adhesive, an epoxy resin, and a thermal pad.

12. The battery module of claim 10, wherein at least a portion of the sealing portion is embedded in the heat transfer member.

* * * * *